United States Patent
El-Musleh

(10) Patent No.: US 12,269,517 B2
(45) Date of Patent: Apr. 8, 2025

(54) PISTON ROD END FOR A LINEAR ACTUATOR, PISTON ASSEMBLY AND SEALING METHOD FOR A PISTON ROD END

(71) Applicant: DELLNER COUPLERS AB, Falun (SE)

(72) Inventor: Khaled El-Musleh, Falun (SE)

(73) Assignee: DELLNER COUPLERS AB, Falun (SE)

( * ) Notice: Subject to any disclaimer, the term of this patent is extended or adjusted under 35 U.S.C. 154(b) by 924 days.

(21) Appl. No.: 17/312,682

(22) PCT Filed: Nov. 22, 2019

(86) PCT No.: PCT/SE2019/051183
§ 371 (c)(1),
(2) Date: Jun. 10, 2021

(87) PCT Pub. No.: WO2020/122787
PCT Pub. Date: Jun. 18, 2020

(65) Prior Publication Data
US 2022/0063684 A1 Mar. 3, 2022

(30) Foreign Application Priority Data
Dec. 14, 2018 (SE) .................... 1851586-6

(51) Int. Cl.
*B61G 11/12* (2006.01)
*B61G 11/04* (2006.01)
*B61G 9/20* (2006.01)

(52) U.S. Cl.
CPC .............. *B61G 11/12* (2013.01); *B61G 11/04* (2013.01); *B61G 9/20* (2013.01); *F16F 2230/30* (2013.01)

(58) Field of Classification Search
USPC ....................................................... 213/223
See application file for complete search history.

(56) References Cited

U.S. PATENT DOCUMENTS

| | | |
|---|---|---|
| 1,074,243 A | 9/1913 | Campbell |
| 1,293,131 A | 2/1919 | Lewis |
| (Continued) | | |

FOREIGN PATENT DOCUMENTS

| | | |
|---|---|---|
| CN | 107299950 A | 10/2017 |
| DE | 2427714 A1 | 1/1975 |
| (Continued) | | |

*Primary Examiner* — Zachary L Kuhfuss
*Assistant Examiner* — Heaven R Buffington
(74) *Attorney, Agent, or Firm* — Dilworth & Barrese, LLP.

(57) ABSTRACT

The present invention relates to a piston rod end for absorbing forces on a linear actuator in a train coupler, the piston rod end comprising a housing (2) enclosing a cavity (23) with a bottom surface (24), the cavity (23) extending in a longitudinal direction in the housing (2), —an elongated insert (3) arranged at least partly inside the cavity (23) of the first portion (P), a spring (5) arranged inside the cavity (23), and a fastening device (4) comprising a transversal element (41) and a longitudinal slot (42) forming a play, one being arranged in the housing and the other in the insert, and configured to cooperate in such a way that the transversal element extends into the slot in a transversal direction in relation to the housing and is movable in the play. The invention also relates to a piston assembly and to a sealing method for sealing the piston rod end.

20 Claims, 5 Drawing Sheets

(56) References Cited

U.S. PATENT DOCUMENTS

Figure 3:
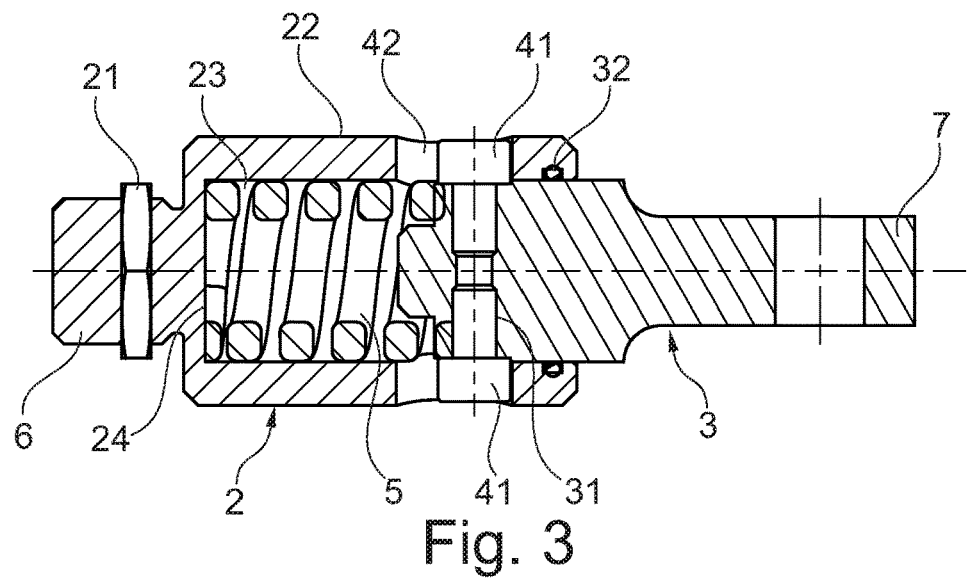

| | | | |
|---|---|---|---|
| 1,447,146 A | | 2/1923 | Novak |
| 1,636,435 A | | 7/1927 | Priebe |
| 1,674,639 A | | 6/1928 | Cotton |
| 2,738,078 A | * | 3/1956 | Tucker .................... B61G 9/06 |
| | | | 213/45 |
| 2,970,703 A | | 2/1961 | Blattner |
| 3,919,509 A | * | 11/1975 | Schnitzius ............. H01R 35/02 |
| | | | 200/82 D |
| 5,074,390 A | * | 12/1991 | Fuhrmann ............. B05C 21/005 |
| | | | 267/64.11 |
| 5,791,445 A | | 8/1998 | Kaufmann et al. |
| 6,199,708 B1 | * | 3/2001 | Monaco .................. F16F 9/585 |
| | | | 213/41 |
| 7,537,127 B2 | * | 5/2009 | Hogbring ................ B61G 9/22 |
| | | | 213/50 |
| 7,600,617 B1 | * | 10/2009 | Mueller .................. B61B 10/00 |
| | | | 188/312 |
| 11,090,559 B2 | * | 8/2021 | Baumgartner .......... A63F 13/98 |

FOREIGN PATENT DOCUMENTS

| | | |
|---|---|---|
| WO | 2004092609 A1 | 10/2004 |
| WO | 2017201535 A1 | 11/2017 |

\* cited by examiner

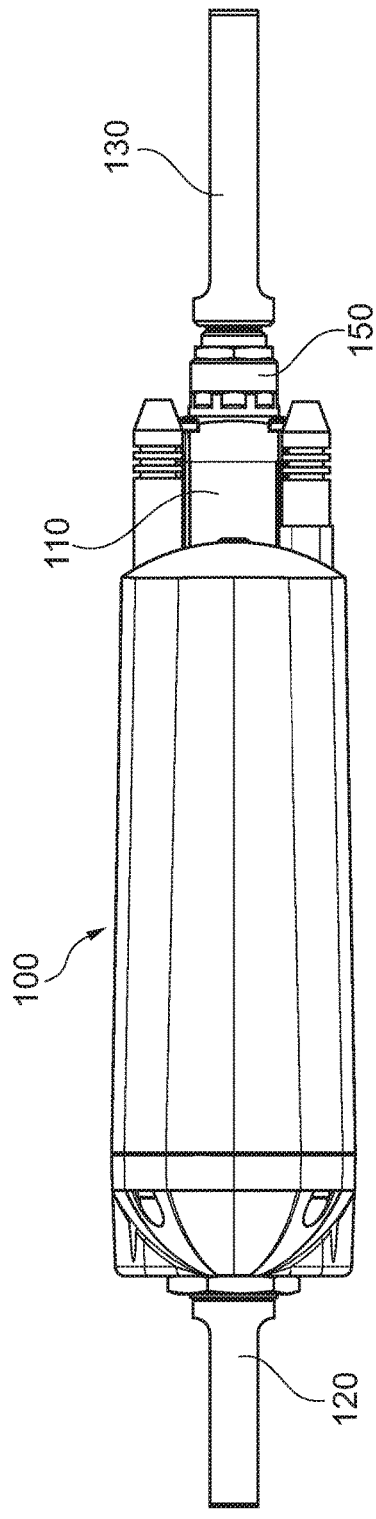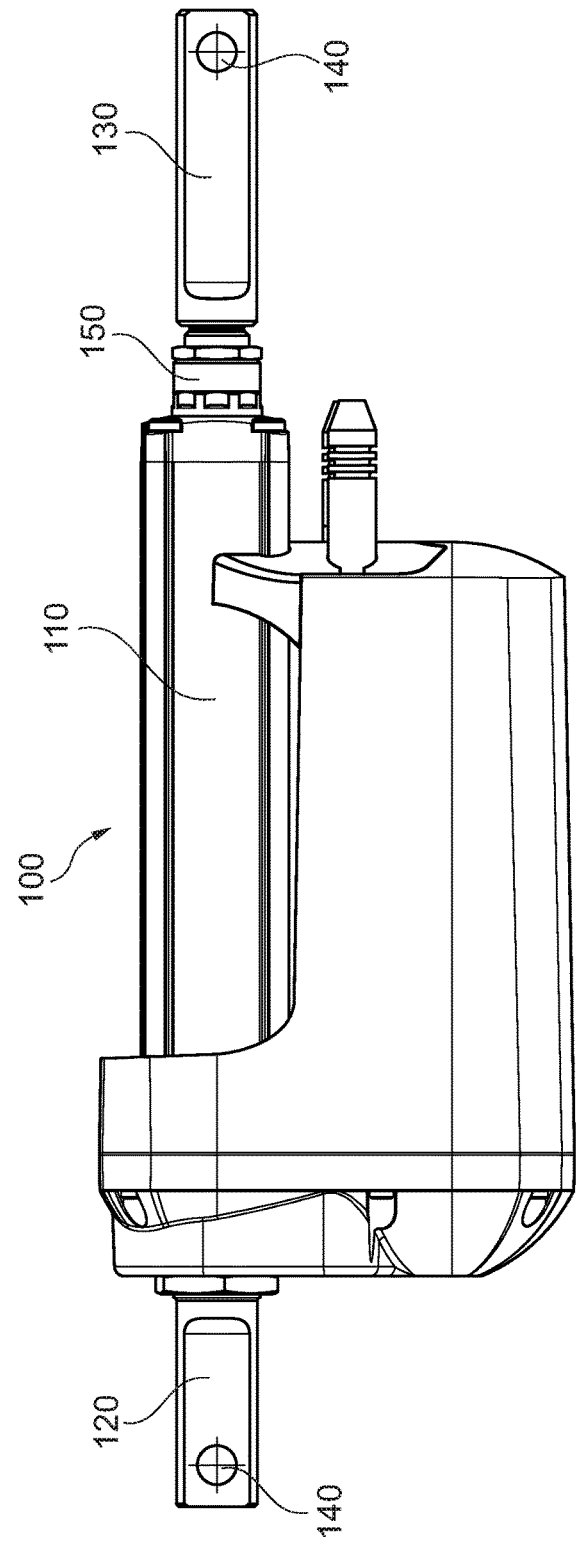

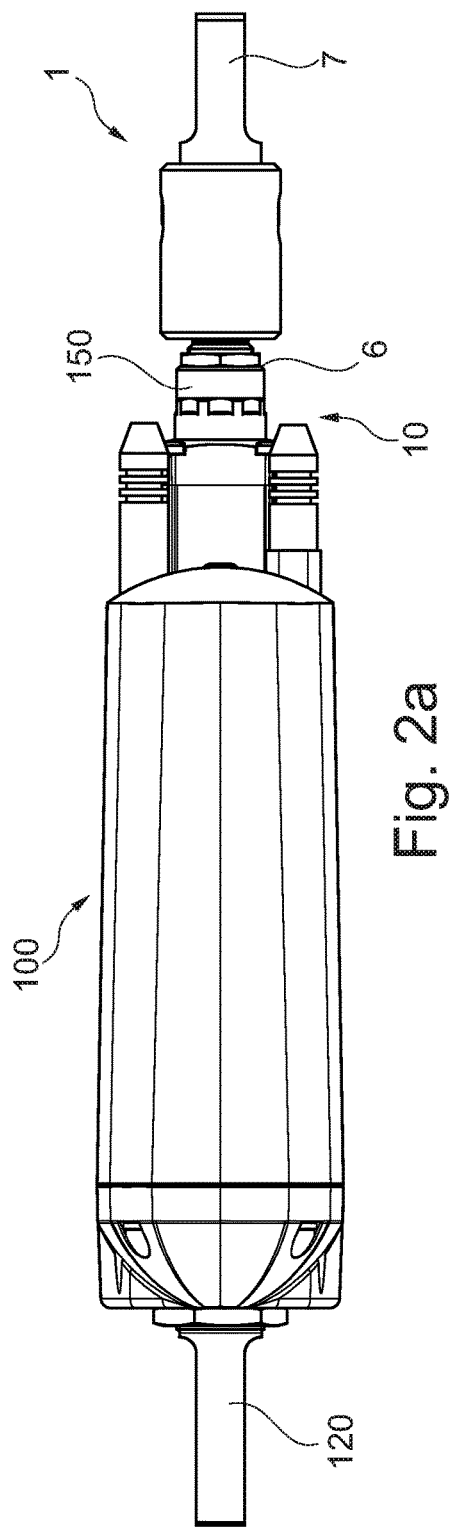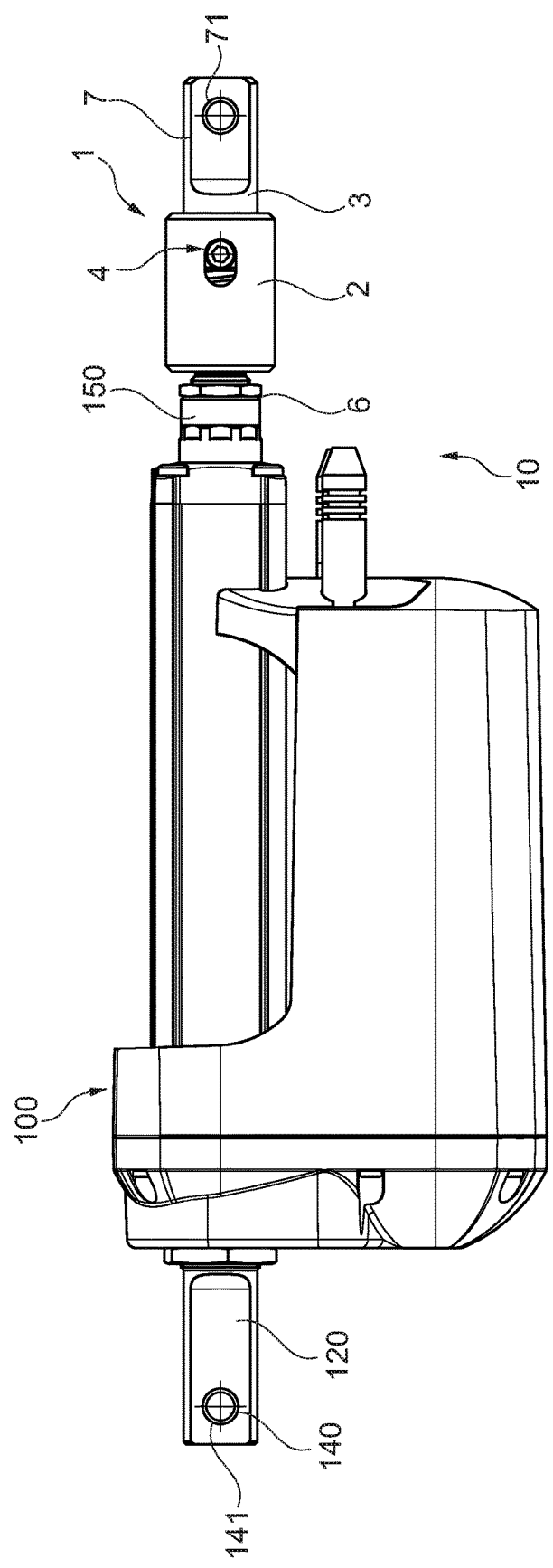

PISTON ROD END FOR A LINEAR ACTUATOR, PISTON ASSEMBLY AND SEALING METHOD FOR A PISTON ROD END

TECHNICAL FIELD

The present invention relates to a piston rod end for absorbing forces on a linear actuator in a train coupler and to a piston assembly comprising a linear actuator and such a piston rod end. The invention also relates to a method for sealing a piston rod end to prevent intrusion of dirt.

BACKGROUND

Train couplers generally comprise linear actuators. Pneumatic actuators are advantageous since they are robust and able to withstand linear forces on the actuator during normal operation of the train coupler due to the pneumatic system that acts as a damper. In some train couplers that lack air tanks for a pneumatic system, electric actuators are used instead.

For electric actuators, the damping effect available to pneumatic actuators is missing and since the electric actuator is generally stiff during operation there is a risk of damage due to forces arising through normal operation of the train coupler. Electric actuators therefore have a significantly shorter lifespan resulting in a need for maintenance and replacement that is costly and cumbersome.

There is therefore a need for improvements in this area that prevent damage to linear actuators and thereby reduce the need for repair and replacement. Especially beneficial are cost effective solutions for protecting existing linear actuators without requiring significant modification.

SUMMARY OF THE INVENTION

The object of the present invention is to eliminate or at least to minimize the problems mentioned above. This is achieved through a piston rod end and a piston assembly comprising such a piston rod end according to the description herein. By also providing a method for sealing a piston rod end according to the description herein, the operation of the piston rod end can be improved by preventing dust and dirt from entering an internal cavity of the piston rod end.

Thus, the piston rod end for absorbing forces on a linear actuator in a train coupler comprises
- a housing enclosing a cavity with a bottom surface, the cavity extending in a longitudinal direction in the housing,
- an elongated insert arranged at least partly inside the cavity,
- a spring arranged inside the cavity, the spring being arranged between the bottom surface and the insert, and
- a fastening device comprising a transversal element and a longitudinal slot forming a play, one being arranged in the housing and the other in the insert, and configured to cooperate in such a way that the transversal element extends into the slot in a transversal direction in relation to the housing and is movable in the play so that the insert is movable in relation to the housing but not removable from the housing, wherein the piston rod end further comprises a first connector for connecting the piston rod end to a linear actuator and a second connector for connecting the piston rod end to a train coupler, one of said first and second connector being arranged on the housing and the other being arranged on the insert.

According to an aspect of the invention, the cavity is essentially cylindrical and the insert is preferably also essentially cylindrical and has a diameter that is less than or equal to a diameter of the cavity. Thereby, the positioning and movement of the insert in relation to the cavity can be improved and a smooth compression and extension of the piston rod end achieved.

According to another aspect of the invention, the transversal element comprises at least one screw, bolt or pin, preferably a socket head screw. Thereby, the transversal element can be mounted after the insert is inserted into the housing and provide a strong and reliable stop for the movement of the insert in relation to the housing by contacting ends of the slot.

According to yet another aspect of the invention, the first connector comprises a rotational stop for preventing rotation of the piston rod end in relation to the first connector, said rotational stop preferably being a jam nut that is joined to the first connector by an external thread on the first connector. Thereby, the piston rod end is held stably in place and linear movement in relation to the linear actuator because of rotation is prevented.

According to a further aspect of the invention, the insert comprises a sealing ring arranged on a circumference of the insert for preventing intrusion of dirt or dust into the cavity. Thereby, the spring is able to contract and extend without being hindered by undesired particles entering the cavity, and the lifetime of the piston rod end is extended.

According to yet another aspect of the invention, the housing comprises an external sealing arranged on an outer circumference for preventing intrusion of dirt or dust into the cavity. Especially in embodiments where the slot is in the housing this protects the cavity further from dirt or dust so ensure smooth operation of the spring and extend the lifetime of the piston rod end.

According to a further aspect of the invention, the piston rod end comprises an additional fastening device that is placed diametrically opposite from the fastening device on the housing and insert. Thereby, the operation of the piston rod end is more stable and by providing the additional transversal element and additional slot forces are distributed evenly between the transversal elements.

According to yet another aspect of the invention, the insert comprises the transversal element and the housing comprises the slot, and wherein the transversal element is arranged to protrude into the slot but not extend beyond an outer surface of the housing. Thereby, the movement of the transversal element is not hindered by the possible presence of the external sealing. Also, the piston rod end can be rendered especially cost effective and robust.

The invention also comprises a piston assembly for a train coupler comprising a linear actuator and a piston rod end according to the invention, the piston rod end being mounted on the linear actuator by the first connector on the piston rod end being joined to an actuator connector on a first end of the linear actuator, preferably by screwing an outer thread on one of the first connector and actuator connector onto an inner thread of the other.

Linear actuators are often designed to extend from a compressed state to a fully extended state (full stroke) without intermediate stroke lengths, and a particular advantage of providing the piston rod end in the piston assembly is that the piston rod end serves to take up additional stroke so that desired tolerances are not exceeded.

According to an aspect of the invention, the linear actuator comprises an electric motor that is arranged to increase or decrease an actuator length, said motor being arranged to operate with a maximum motor force and the spring of the piston rod end further having a spring force, said spring force being smaller than or equal to the maximum motor force. Thereby, the piston rod end will absorb vibrations or small longitudinal movements when mounted in a train coupler to protect the linear actuator.

According to another aspect of the invention, there is provided a second piston rod end according to the invention, the second piston rod end being mounted on a second end of the linear actuator.

The present invention also comprises a sealing method for sealing the piston rod end to prevent intrusion of dirt or dust into the cavity. The sealing method comprises
inserting a housing of a piston rod end into a sealing tube,
heating at least one portion of the sealing tube in order to shrink the sealing tube to fit against the housing
wherein said at least one portion is a portion that is not in contact with a fastening device of the housing.

Thereby, a secure seal is provided that ensures the operation of the spring and insert without risking obstruction or wear because of substances or particles that could otherwise intrude through an opening in the housing. By heating at least one portion that is not in contact with the fastening device, operation of the fastening device is further ensured so that the risk of the sealing tube sticking to the fastening device is minimized or even eliminated.

According to an aspect of the invention, at least one adhesive device is placed between the housing and the sealing tube before heating. Thereby, slippage of the sealing tube in relation to the housing is prevented.

According to another aspect of the invention, at least two portions of the sealing tube are heated, said at least two portions being distributed around a circumference of the sealing tube. Thereby, a symmetrical shrinking of the sealing tube is achieved to ensure a good fit on the housing.

Many additional benefits and advantages of the invention will become readily apparent to the person skilled in the art in view of the detailed description below.

DRAWINGS

Figure 4A:
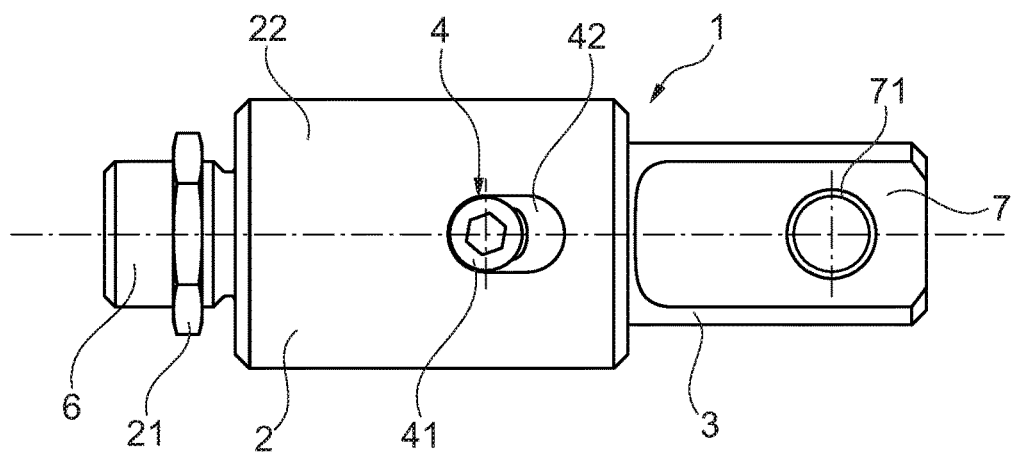
Figure 4B:
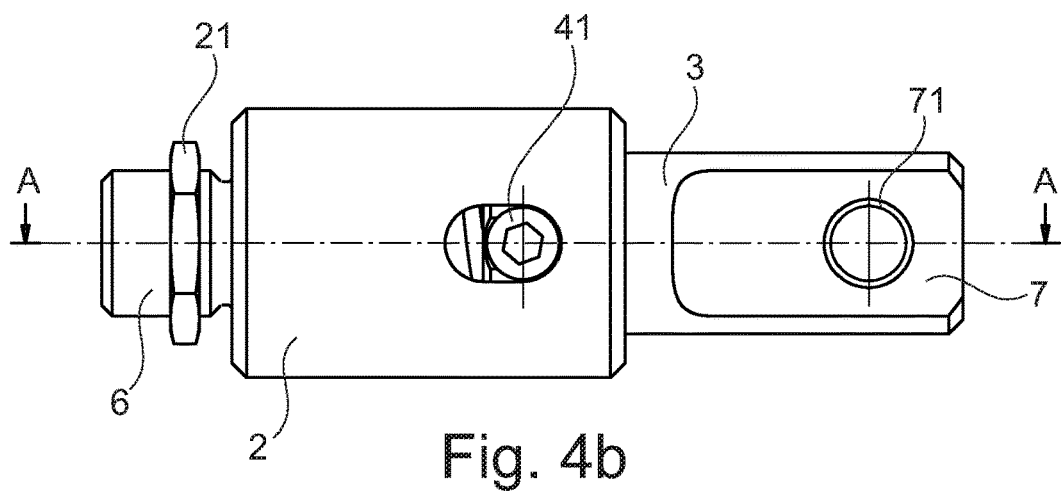
Figure 5A:
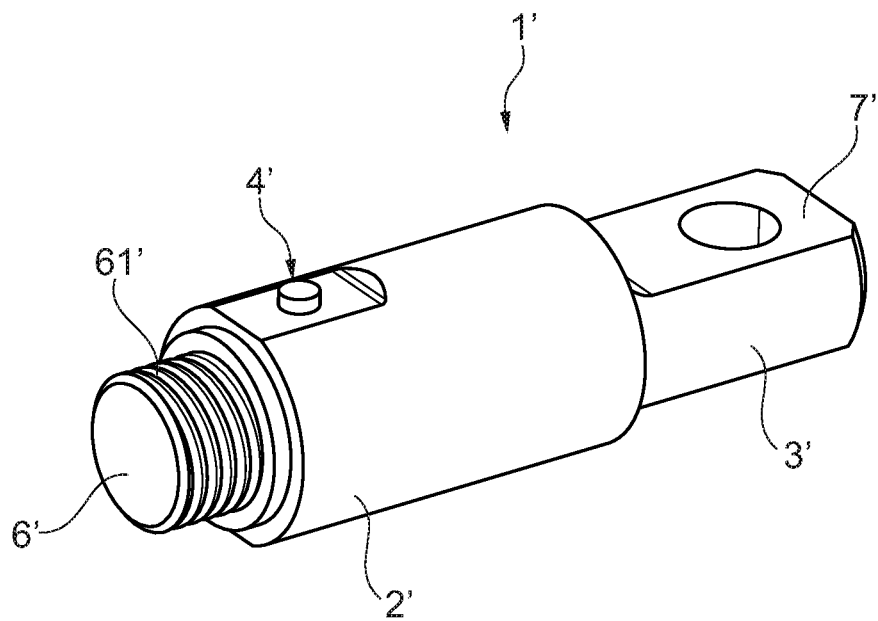
Figure 5B:
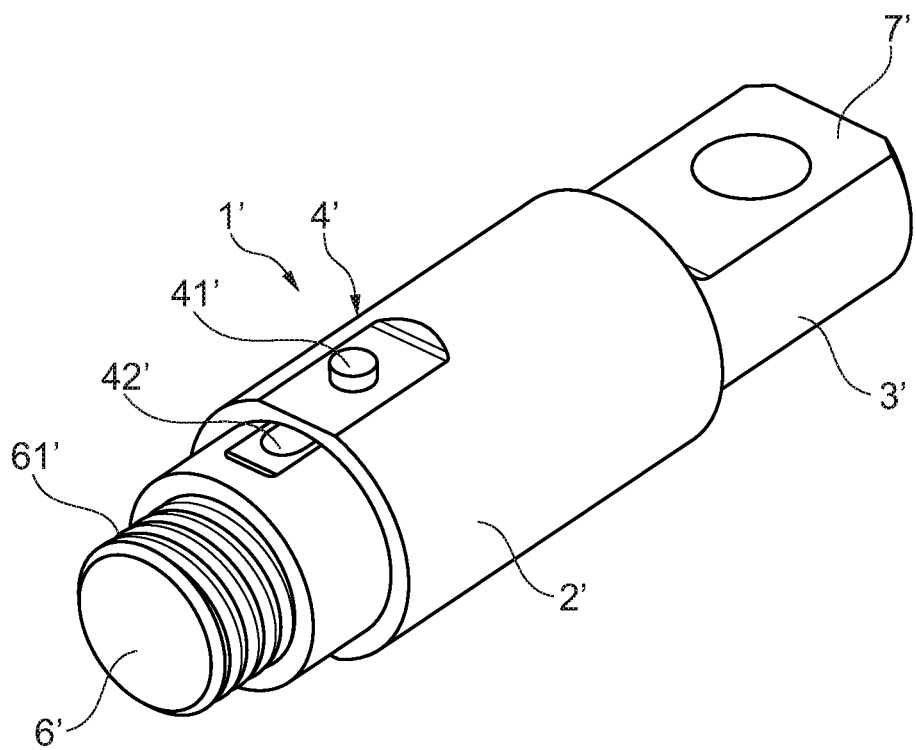

The invention will now be described in more detail with reference to the appended drawings, wherein FIG. 1a discloses a planar view from above of a linear actuator for a train coupler according to the prior art;

FIG. 1b discloses a planar view from the side of the linear actuator of FIG. 1a;

FIG. 2a discloses a planar view from above of a piston assembly according to the present invention, comprising a linear actuator connected to a piston rod end according to a preferred embodiment of the present invention;

FIG. 2b discloses a planar view from the side of a piston assembly according to the present invention, of the linear actuator and piston rod end of FIG. 2a;

FIG. 3 discloses a cross-sectional view from the side of the piston rod end of FIG. 2a-2b;

FIG. 4a discloses a planar view from above of the piston rod end of FIG. 2a-2b in a compressed state;

FIG. 4b discloses a planar view from above of the piston rod end of FIG. 2a-2b in an extended state;

FIG. 5a discloses a perspective view of a second embodiment of a piston rod end according to the present invention, the piston rod end being in a compressed state;

FIG. 5b discloses a perspective view of a second embodiment of a piston rod end according to the present invention, the piston rod end being in an extended state.

Figure 6A:
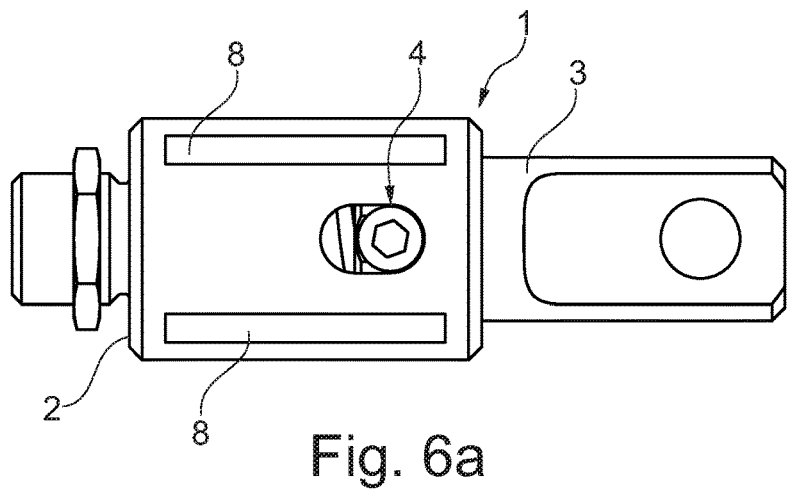
Figure 6B:
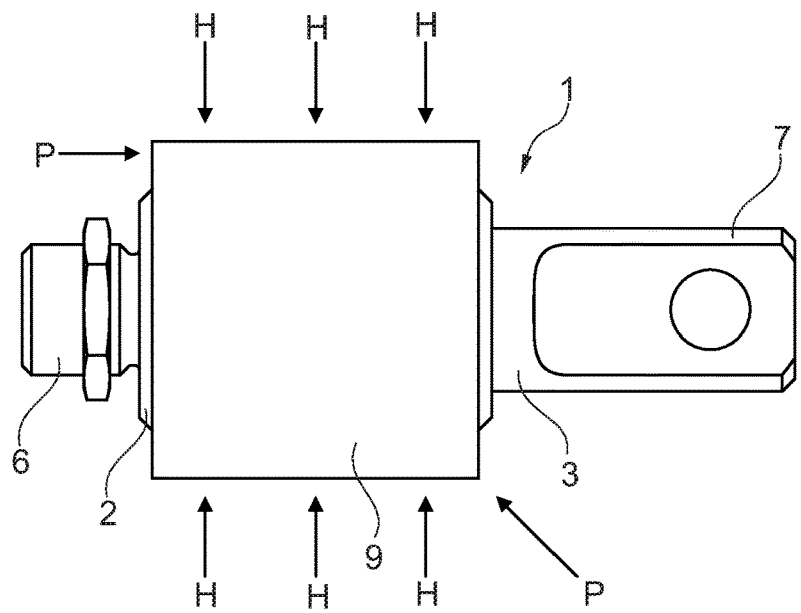
Figure 6C:
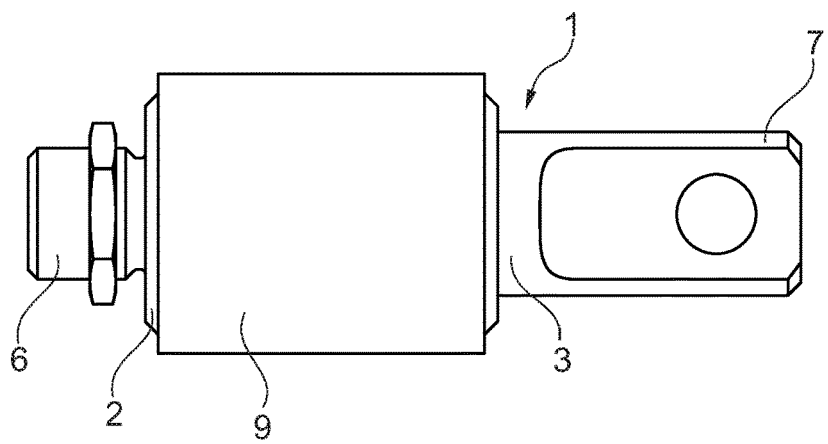

FIG. 6a discloses a planar view from above of the piston rod end with two adhesive devices for securing a sealing tube on the housing;

FIG. 6b discloses a planar view from above of the piston rod end of FIG. 6a after insertion into a sealing tube; and FIG. 6c discloses a planar view from above of the piston rod end of FIG. 6b after the sealing tube has been shrunk into place on the housing.

DETAILED DESCRIPTION

FIG. 1a-1b discloses a linear actuator 100 according to the prior art, having an actuator body 110 or piston, a first linear actuator connector 120 also known as a back fixture and a second linear actuator connector 130 for mounting the linear actuator 100 in a train coupler, preferably by means of through holes 140 into which fastening elements can be inserted for fixating the linear actuator. The linear actuator 100 is able to extend and contract between an extended state and a compressed state by means of an electrical motor (not shown) as is well known within the art. The second linear actuator connector 130 is mounted on the linear actuator body 110 by fastening to an actuator connector 150, preferably by screwing but commonly also by other means. The second linear actuator connector 130 is generally a stiff part and cannot be compressed; it therefore acts as an extension of the actuator body 110.

FIG. 2a-2b discloses a piston assembly 10 according to a preferred embodiment of the present invention, comprising a piston rod end 1 according to the invention that is mounted on a linear actuator 100 by a first connector 6 being joined to an actuator connector 150 at a first end of the linear actuator 100, preferably by screwing an outer thread on one of the first connector 6 and actuator connector 150 onto an inner thread of the other. In one embodiment the piston assembly 10 also comprises a second piston rod end 1 that is mounted on a second end of the linear actuator 100.

Linear actuators such as the linear actuator 100 generally have a tolerance (typically tolerances on the built-in dimensions as well as on the stroke length depending on the manufacturer) that makes it difficult to predict an actual piston length when the linear actuator is extended to full stroke. By adding a piston rod end 1 to the linear actuator 100 to form the piston assembly 10, the piston rod end 1 will be able to compensate for this so that the linear actuator 100 can be extended to a desired length regardless of the tolerance. The piston rod end 1 comprises a housing 2 and an insert 3 that is mounted in the housing 2 together with a spring 5 (see FIG. 3) so that a length of the piston rod end 1 can vary between a compressed state and an extended state, as will be described in more detail below. A fastening device 4 connects the housing 2 and the insert 3 and creates a play that allows the insert 3 and the housing 2 to move in relation to each other. A second connector 7 is also provided on the piston rod end 1 and serves the same function as the second linear actuator connector 130 described above with reference to the prior art. Thus, the piston rod end 1 is connectable to the linear actuator 100 to form the piston assembly 10 and allows for a total length of the linear actuator 100 and piston rod end 1 to vary within predetermined allowances so that forces on the linear actuator 100 during operation of the train coupler can be absorbed by the piston rod end 1 and damages to the linear actuator can be prevented.

FIG. 3 discloses the piston rod end 1 in more detail, showing the housing 2 with a housing wall 22. The housing 2 encloses a cavity 23 that extends in a longitudinal direction in the housing 2 and that has a bottom surface 24. The housing 2 also comprises a rotational stop 21 that is provided to prevent undesired rotation of the piston rod end 1 in relation to the linear actuator 100 when mounted. In this embodiment, the rotational stop 21 is a jam nut that is joined to the first connector 6 by an external thread on the first connector 6. The rotational stop 21 also has the function of adapting a length of the piston rod end 1 at mounting, especially when threads are provided on the piston rod end 1 and linear actuator 100. The piston rod end 1 is thus screwed onto the linear actuator 100 or vice versa until a desired total length of the piston assembly 10 has been reached and the rotational stop 21 is then used to prevent further rotational movement of one against the other.

The piston rod end 1 also comprises an insert 3 that is at least partly inserted into the cavity 23 and that is fastened to the housing 2 by a fastening device 4. The insert 3 preferably has an essentially cylindrical shape and matches dimensions of the cavity 23 so that the insert 3 fits snugly into the cavity 23 and is able to move with low friction or no friction at all. Preferably, a sealing 32 such as an O-ring is provided between the insert 3 and an inner wall of the cavity 23 of the housing 2. In this embodiment, the cavity 23 is essentially cylindrical and the insert 3 is also essentially cylindrical and has a diameter that is less than or equal to a diameter of the cavity 23. In other embodiments, the cavity may instead have a rectangular or an oval cross-section.

Between the bottom surface 24 of the cavity 23 and the insert 3 the spring 5 is placed for absorbing and damping movements of the insert 3 in relation to the housing 2 such as when subjected to forces during operation of the train coupler.

The fastening device 4 comprises a transversal element 41 that is in this embodiment mounted in a bore 31 in the insert 3 and a slot 42 formed in the housing wall 22 that creates a play within which the transversal element 41 is movable. When a force is applied to the insert 3, either by the insert 3 being pushed into the housing 2 by an external force or by the insert 3 being pushed out of the housing 2 by the spring 5, the transversal element 41 and the slot 42 cooperate to allow the insert 3 to move in relation to the housing 2. Thus, the play determines the possible compression of the piston rod end 1 from an extended state where the insert 3 is pushed as far away from the bottom surface 24 as possible to a compressed state where the insert 3 is pushed as far towards the bottom surface 24 as the play allows. By selecting a length of the play it can be determined how a length of the piston rod end 1 should be allowed to vary. It is advantageous to select the force necessary for compressing the spring 5 to be smaller than a maximum force of the motor of the linear actuator 100, since this allows for the piston rod end 1 to absorb forces applied to the piston assembly 10 an prevent damages to the linear actuator 100 itself.

The transversal element 41 is arranged to extend into the slot in an essentially transversal direction in relation to the housing and serves to be movable in the play so that the insert 3 is movable but not removable in relation to the housing 2. The transversal element 41 may be a screw, bolt or pin that is inserted into the bore 31 and fastened there in any suitable way such as by screwing for instance. It is advantageous for the transversal element 41 to be a socket head screw that provides a stable fastening into the bore 31 and at the same time is able to withstand large forces in the longitudinal direction to give the fastening device 4 a long lifetime and prevent fatigue and breakage. The piston rod end 1 is a self-compressible component due to the transversal element 41 acting as a joining point between the insert 3 and the housing 2. When the piston rod end 1 is assembled, a pretension is applied to the screw 5 before mounting the first connector 6 firmly on the housing 2 so that play is avoided between the housing 2 and first connector 6. In other embodiments, the first connector 6 may be integrally formed with the housing 2.

The first connector 6 and second connector 7 are in this embodiment part of the housing 2 and the insert 3, respectively, but it is to be noted that the piston rod end 1 could alternatively be designed to have the first connector 6 on the insert 3 and the second connector 7 on the housing 2.

FIG. 4a shows the piston rod end 1 in the compressed state with the transversal element 41 at one end of the slot 42 and FIG. 4b shows the extended state with the transversal element 41 at another end of the slot 42.

It is beneficial for the piston rod end 1 to comprise two fastening devices 4. Preferably, the fastening devices 4 are arranged on opposite sides of the housing 2, so that transversal elements 41 are mounted in bores 31 on opposite sides of the insert 3 and slots 42 are provided on opposite sides of the housing 2. This allows for a more stable and sturdy piston rod end 1 that is able to function for a longer time without needing replacement or repair.

In one embodiment, the piston assembly 10 comprises two piston rod ends 1 that are mounted on either side of the linear actuator 100 so that the total length of the piston assembly 10 is able to vary within a larger interval without requiring changing proportions of the piston rod end 1.

FIG. 5a-b disclose a second embodiment that differs from the preferred embodiment above mainly in the fastening device 4' being configured in such a way that the transversal element 41' is arranged on the housing 2' and the slot 42' is arranged on the insert 3'. This embodiment has the advantage that the cavity inside the housing 2' can be protected from dirt and dust without requiring an external sealing, since there is no opening in the housing 2' that provides access to the cavity inside. In other respects, the second embodiment is similar to the preferred embodiment and the operation of the piston rod end 1' is also similar in both embodiments. Reference numerals denoting parts of the second embodiment include an apostrophe but are otherwise identical to the reference numerals of the preferred embodiment. It is advantageous that the transversal element 41' is arranged to extend into the slot 42' at one end and not to extend beyond the surface of the housing 2' at its other end, or to extend only slightly.

All embodiments of the present invention may comprise at least one bearing element 71, 141 that may be arranged on either or both of the second connector 7 of the piston rod end 1 and the first linear actuator connector 120 of the linear actuator 100 (see FIG. 2b and FIG. 4a-4b). The bearing element 71, 141 is preferably a spherical bearing element such as ball bearings. This has the benefit of absorbing bending forces to which the piston assembly 10 is subjected and preventing damage or breakage along the piston assembly 10. FIG. 6a-c disclose an external sealing 9 that is mounted on the housing 2 to protect the piston rod end 1 from dust and dirt that might otherwise reach the cavity 23 through the slot 42 in the housing 2. The external sealing 9 is preferably made from a material that is able to fit on the housing without hindering operation of the piston rod end 1, and any sealing material such as polymers or rubbers are generally suited to this purpose. It is especially advantageous to use a material that can be mounted without seams or joins, such as a shrinking tube that is applied and shrunk into place by means of heating.

The method for sealing the piston rod end 1 according to the present invention will now be described in more detail with reference to FIG. 6a-6c.

Thus, in order to mount an external sealing 9 the housing 2 is inserted into a sealing tube (see FIG. 6b) and heat H is applied to at least one portion P of the external sealing or sealing tube 9. When heated, the sealing tube 9 shrinks until it fits on the surface of the housing 2 (see FIG. 6c). The portion or portions P are selected in such a way that they are not in contact with the fastening device 3, in order to prevent the sealing tube 9 from being attached to the fastening device 4 in such a way that movement of the transversal element 41 in relation to the slot 42 is hindered. Thus, by heating portions P that when shrunk will adhere to the housing 2 but not to the fastening device 4 directly, a good fit of the sealing tube 9 onto the housing 2 can be achieved and the operation of the piston rod end 1 be allowed to proceed without interference from the external sealing 9.

It is advantageous to use a length of sealing tube that fits on the housing 2 but does not extend beyond it, to prevent hindering the movement of the insert 3 in relation to the housing 2.

It is also advantageous to provide at least one but preferably a plurality of adhesive devices 8 between the housing 2 and the sealing tube 9. In FIG. 6a, adhesive devices 8 in the form of adhesive strips 8 are disclosed. The adhesive strips 8 are preferably placed on the housing 2 before insertion of the housing 2 into the sealing tube 9, so that the sealing tube 9 when shrunk onto the housing 2 firmly adheres to the adhesive strips 8 to prevent movement of the sealing tube 9 in relation to the housing 2. In FIG. 6a the adhesive strips are placed longitudinally on the housing 2 but they could alternatively be placed around a circumference of the housing 2 or in other ways. A combination of longitudinal and circumferential placements could also be used, or any other combination of orientations. Again, it is advantageous to place the adhesive device 8 so that contact with the fastening device 4 is avoided, in order to prevent interference with the operation of the piston rod end 1.

It is beneficial to heat a plurality of portions P that are distributed around a circumference of the housing 2 to allow for a symmetrical shrinking of the sealing tube 9.

It is advantageous to use materials for the piston rod end that are suitable for use in aggressive environments and that are durable and not susceptible to wear and tear. The housing 2 may be made from 1.4301 Stainless Steel and the insert 3 is preferably made from CuSn12 (Material Standard EN 1982). This allows free smooth movement between the insert 3 and the housing 2 which will act as a plain bearing. In addition, both these materials have good corrosion resistance properties. Similar materials may of course also be used within the scope of the present invention, as long as they are suitable for use with a linear actuator in a train coupler. The fastening element or elements 41, 41' are preferably secured to the housing 2 or insert 3' by a fixating substance such as Locktite 243 or similar. This ensures that undesired loosening of the transversal element 41, 41' is prevented.

It is to be noted that features from the various embodiments described herein may freely be combined, unless it is explicitly stated that such a combination would be unsuitable.

The invention claimed is:

1. Piston assembly for a train coupler comprising a linear actuator (100) and a piston rod end (1), the piston rod end (1) comprising
    a housing (2) enclosing a cavity (23) with a bottom surface (24), the cavity (23) extending in a longitudinal direction in the housing (2),
    an elongated insert (3) arranged at least partly inside the cavity (23),
    a spring (5) arranged inside the cavity (23), the spring (5) being arranged between the bottom surface (24) and the insert (3), and
    a fastening device (4) comprising a transversal element (41) and a longitudinal slot (42) forming a play, one being arranged in the housing (2) and the other in the insert (3), and configured to cooperate in such a way that the transversal element (41) extends into the slot (42) in a transversal direction in relation to the housing (2) and is movable in the play so that the insert (3) is movable in relation to the housing (2) but not removable from the housing (2),
    wherein the piston rod end (1) further comprises a first connector (6) for connecting the piston rod end (1) to the linear actuator (100) and a second connector (7) for connecting the piston rod end (1) to a train coupler, one of said first (6) and second (7) connectors being arranged on the housing (2) and the other being arranged on the insert (3), and
    the piston rod end (1) is mounted on the linear actuator (100) by the first connector (6) on the piston rod end (1) being joined to an actuator connector (150) on a first end of the linear actuator (100).

2. Piston assembly according to claim 1, wherein the cavity (23) is essentially cylindrical.

3. Piston assembly according to claim 2, wherein the insert (3) is also essentially cylindrical and has a diameter that is less than or equal to a diameter of the cavity (23).

4. Piston assembly according to claim 1, wherein the transversal element (41) comprises at least one screw, bolt or pin.

5. Piston assembly according to claim 4, wherein the transversal element (41) comprises a socket head screw.

6. Piston assembly according to claim 1, wherein the first connector (6) comprises a rotational stop (21) for preventing rotation of the piston rod end (1) in relation to the first connector (6).

7. Piston assembly according to claim 6, wherein said rotational stop (21) is a jam nut that is joined to the first connector (6) by an external thread on the first connector (6).

8. Piston assembly according to claim 1, wherein the insert (3) comprises a sealing ring (32) arranged on a circumference of the insert (3) or on an inner wall of the cavity (23) for preventing intrusion of dirt or dust into the cavity (23).

9. Piston assembly according to claim 1, wherein the housing (2) comprises an external sealing (9) arranged on an outer circumference for preventing intrusion of dirt or dust into the cavity (23).

10. Piston assembly according to claim 1, further comprising an additional fastening device that is placed diametrically opposite from the fastening device (4) on the housing (2) and insert (3).

11. Piston assembly according to claim 1, wherein the insert (3) comprises the transversal element (41) and the housing (2) comprises the slot (42), and the transversal element (41) is arranged to protrude into the slot (42) but not extend beyond an outer surface of the housing (2).

12. Piston assembly according to claim 1, further comprising a bearing element (71) arranged on the second connector (7).

13. Piston assembly according to claim 1, wherein the linear actuator (100) comprises an electric motor that is arranged to increase or decrease an actuator length, said motor being arranged to operate with a maximum motor force and the spring (5) of the piston rod end (1) further having a spring (5) force, said spring (5) force being smaller than or equal to the maximum motor force.

14. Piston assembly according to claim 1, further comprising a second piston rod end, the second piston rod end being mounted on a second end of the linear actuator (100).

15. Piston assembly according to claim 1, further comprising a bearing element (141) arranged on a first linear actuator (100) connector (120).

16. Piston assembly according to claim 15, further comprising a bearing element (71) on the second connector (7) of the piston rod end (1).

17. Sealing method for sealing a piston assembly according to claim 1, comprising inserting the housing (2) of the piston rod end (1) into a sealing tube (9), and heating at least one portion (P) of the sealing tube (9) in order to shrink the sealing tube (9) to fit against the housing (2), wherein said at least one portion (P) is a portion that is not in contact with the fastening device (4) of the housing (2).

18. Sealing method according to claim 17, wherein at least one adhesive device (8) is placed between the housing (2) and the sealing tube before heating.

19. Sealing method according to claim 17, wherein at least two portions (P) of the sealing tube (9) are heated, said at least two portions (P) being distributed around a circumference of the sealing tube (9).

20. Piston red assembly according to claim 1, wherein the first connector (6) on the piston rod end (1) is joined to the actuator connector (150) on the first end of the linear actuator (100) by screwing an outer thread on one of the first connector (6) and actuator connector (150) onto an inner thread of the other.

* * * * *